Aug. 11, 1970     D. E. RAINEY     3,523,625
DISPLAY AND VENDING APPARATUS
Original Filed Jan. 18, 1967     5 Sheets-Sheet 1
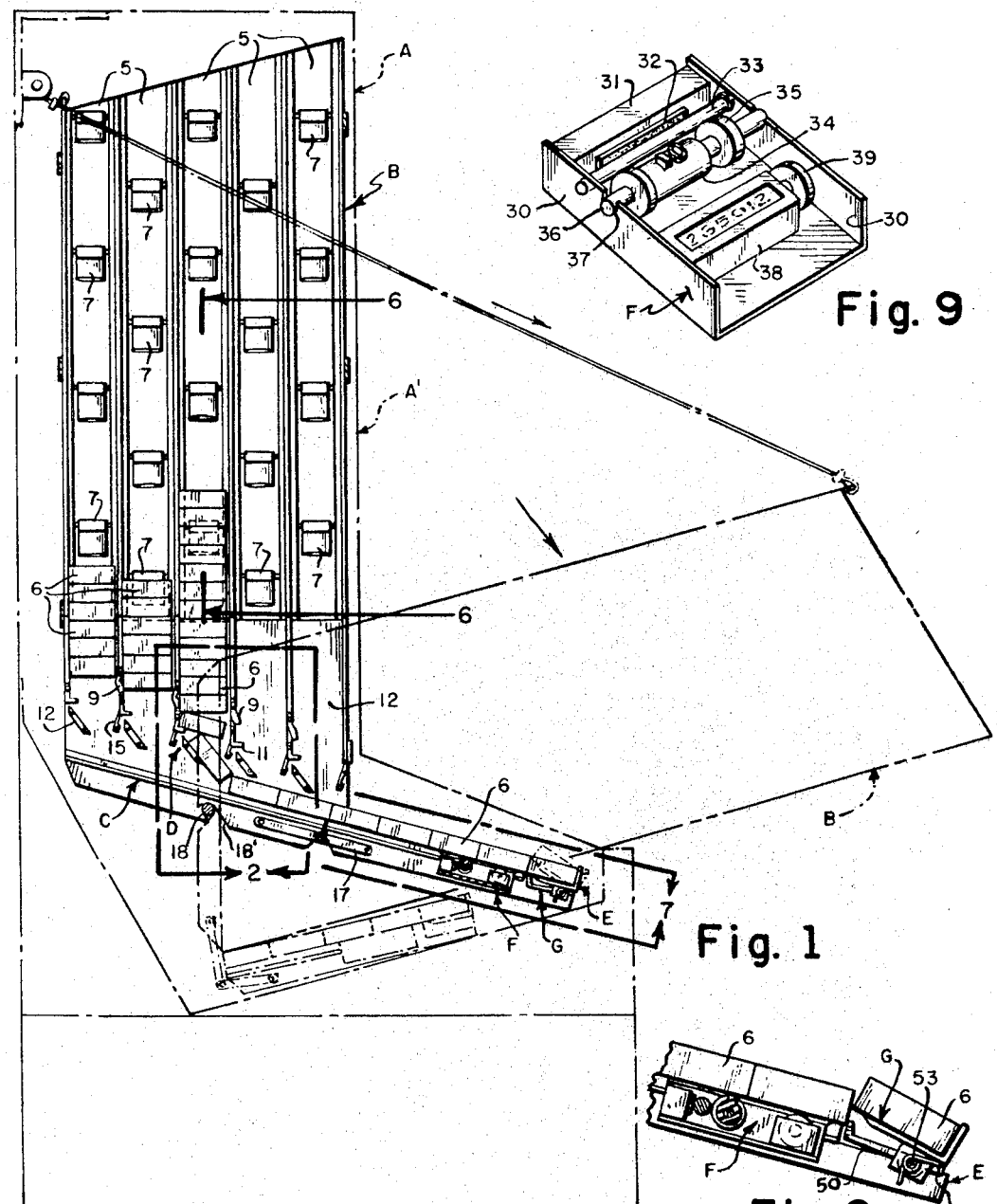
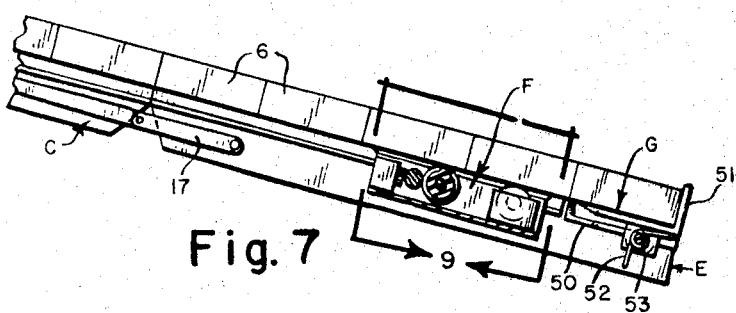
INVENTOR.
DON E. RAINEY Aug. 11, 1970   D. E. RAINEY   3,523,625
DISPLAY AND VENDING APPARATUS
Original Filed Jan. 18, 1967   5 Sheets-Sheet 2

INVENTOR.
DON E. RAINEY

INVENTOR.
DON E. RAINEY

Aug. 11, 1970     D. E. RAINEY     3,523,625
DISPLAY AND VENDING APPARATUS
Original Filed Jan. 18, 1967     5 Sheets-Sheet 4
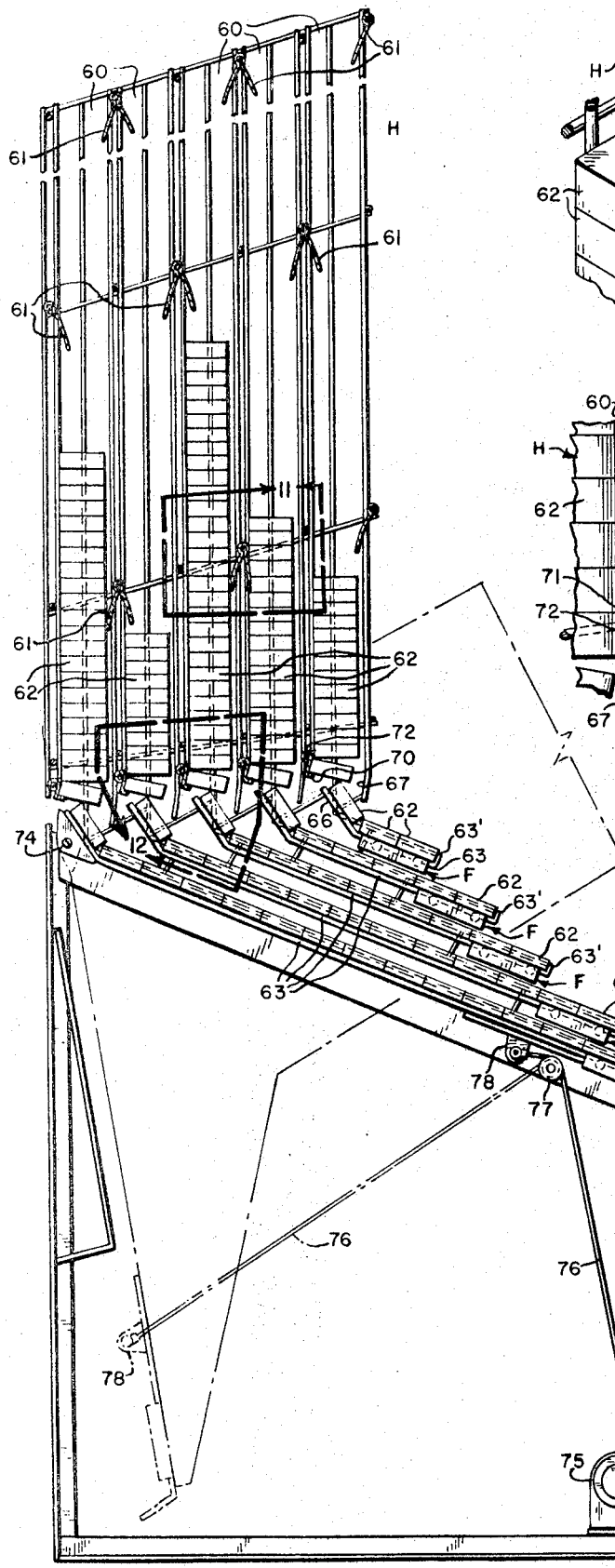
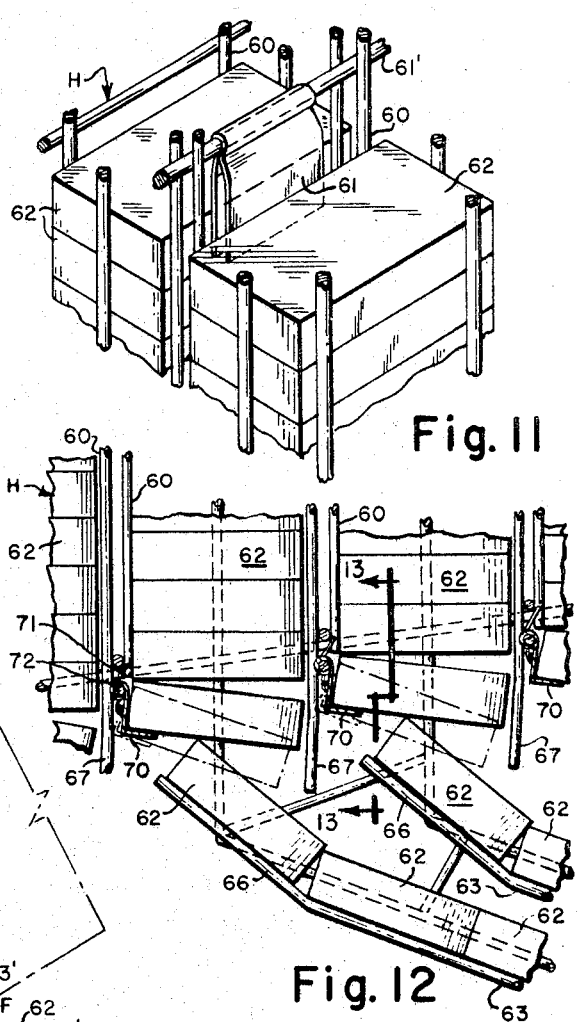
Fig. 11
Fig. 12
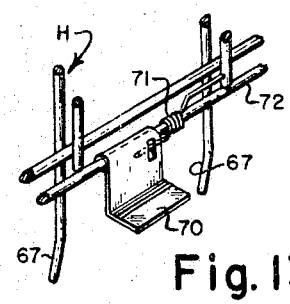
Fig. 13
Fig. 10
INVENTOR.
DON E. RAINEY

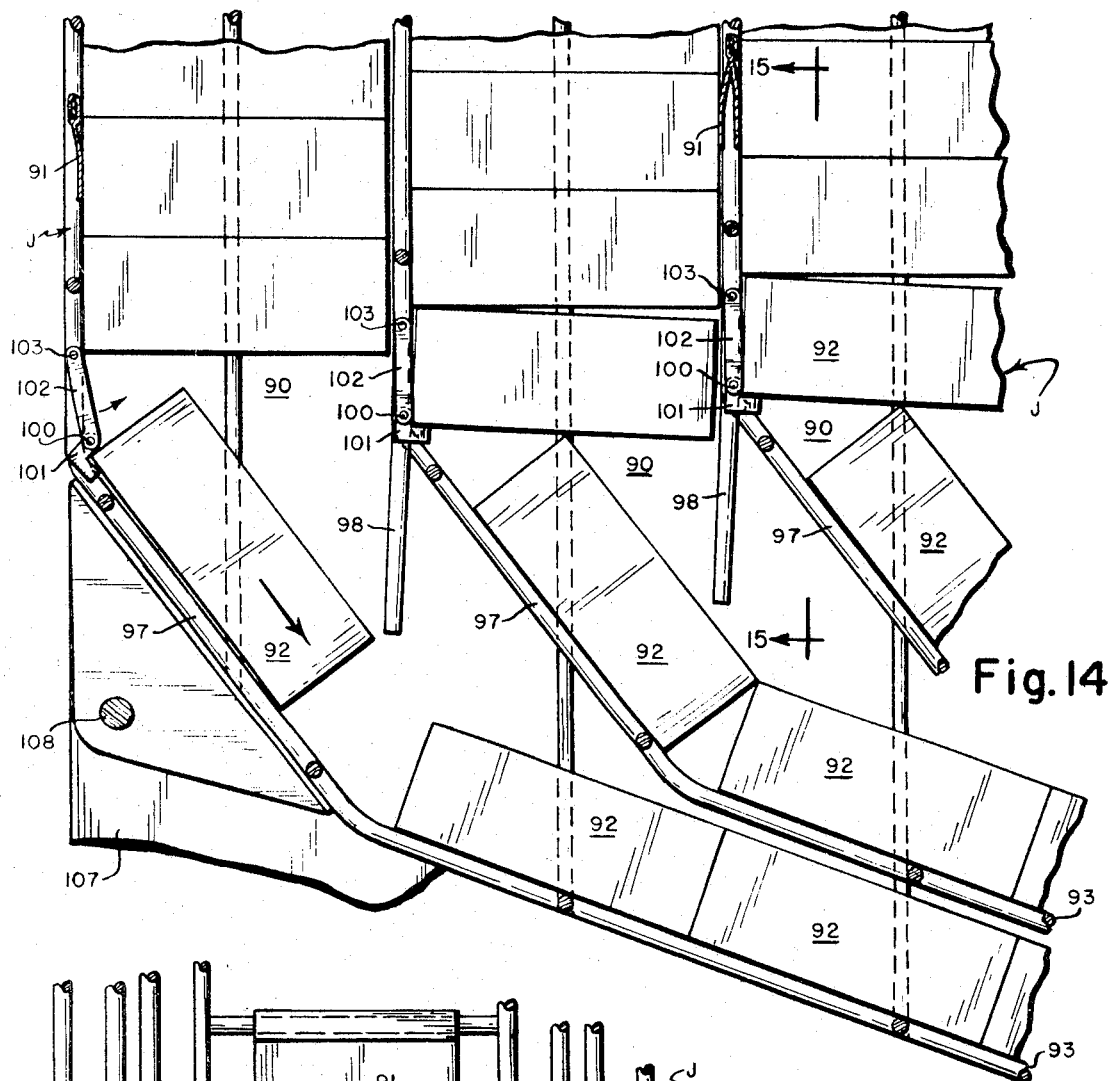
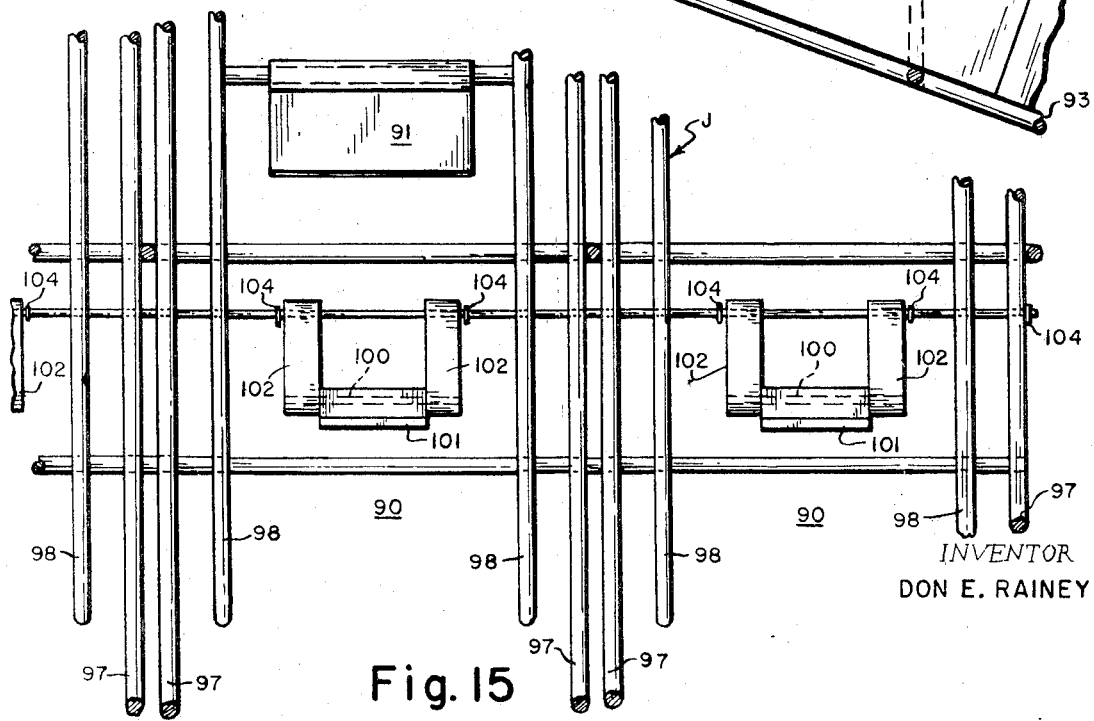

United States Patent Office 3,523,625
Patented Aug. 11, 1970

3,523,625
DISPLAY AND VENDING APPARATUS
Don E. Rainey, East Pompano Beach, Fla., assignor of forty-six percent to Don E. Rainey, fourteen and one-half percent to Melvin E. Hopstetter, twenty-three and one-half percent to Albert Florio, Americo Florio, and George Florio as cotenants, one percent to Rufus H. Nesmith, five percent to John Serlo, all of Fort Lauderdale, two percent to Alfred T. Hall, six percent to A. J. Musselman, Jr., both of Pompano Beach, and two percent to Henry Grannemann, Dearfield Beach, Fla.
Original application Jan. 18, 1967, Ser. No. 614,768. Divided and this application May 29, 1968, Ser. No. 740,409
Int. Cl. B65g 59/00
U.S. Cl. 221—2
14 Claims

ABSTRACT OF THE DISCLOSURE

Display and vending apparatus having rearward vertical storage chutes for receiving articles in stacked horizontal position and a forward inclined display and dispensing trackway for slidably receiving articles progressively from said chutes, a stop device at the outer end of the trackway to limit the sliding movement of the articles and transposer means pivotally supported at the lower end of each chute to shift the lowermost article in the chute to downwardly inclined position in the trackway.

---

The present application is a division of my copending application Ser. No. 614,768, filed Jan. 18, 1967, now Pat. No. 3,433,545.

This invention relates to a system for display and dispensing packaged food products or other articles and contemplates a cabinet having vertical chutes in multiple depth communicating with a revolutionizing mechanically controlled dispensing feature called a mechanical gravitation converter or transposer attached to the bottom section of each chute that converts the angle of the package to flow out and into an inclined display trackway.

The filling of the chutes from the top and the dispensing from the bottom causes automatic rotation of the product and the forward motion created by the weight of the packages in the trackways, activates a stamping roller and a counter device, making it an automatic and stamping mechanism. Therefore, when the packages are removed from the machine, they are already automatically priced and inventoried.

The assembly of the chutes can be used, and either refregirated or non-refrigerated cartons, packages or other items and can be utilized, for instance, in grocery stores or drug stores to replace shelving, inventorying, pricing, rotation of stock and refrigeration, where needed. Utilization of floor space is increased by approximately 2½ times as much volume of product. This invention will enable the customer to see the products, each separately compartmented. The product will be displayed and dispensed at the most convenient height, making it unnecessary for the customer ever to reach high or stoop to remove the item.

The system of this invention involves a front loading machine having a dispensing device at the forward part of the display and dispensing trackway. As the package is pressed down on the forward part, the back part of the package rises for easy removal. This device holds back the next package in line until the forward package has been removed.

The series or bank of chutes is pivoted at the bottom of the display chute inside the cabinet. The bank of chutes can be pulled out from the top and brought down into a loading position from the front with the display trackway being hinged to the vertical chutes, thus allowing the bottom track to lock the packages into position both forward and backward of a supporting hinge. The front part of the display chute will rest on guides built into the forward underside of the display chute and attached to the cabinet.

This system can be operated either with or without the conventional coin device and can be operated mechanically or electrically. The device contemplates the storage and dispensing of various products, such as square or rectangular cartons, bottles or the like.

Upon insertion of a key, the vertical chutes being hinged on the bottom and back will pull out from the top for loading purposes. A counter balancing spring, located in the bottom of the cabinet, is used to retard the vertical chutes on their forward and downward motion to loading position.

In the drawings:

FIG. 1 is a view partly in vertical section and partly in elevation of one form of the invention illustrating a plurality of chutes formed by structural shapes and an associated single inclined trackway leading from the several chutes;

FIG. 7 is a partial enlarged longitudinal sectional view of the dispensing end of the inclined trackway;

FIG. 8 is a partial enlarged view similar to FIG. 7 and illustrating a spring controlled mechanism for stopping and dispensing the food packages;

FIG. 9 is an enlarged partial perspective view taken in the area 9 of FIG. 7 illustrating a stamping roller and a counting mechanism;

FIG. 10 is a view partly in vertical section and partly in elevation of a modified form of the invention illustrating a plurality of chutes and an inclined trackway leading from each of said chutes;

FIG. 11 is an enlarged partial perspective view illustrating the chutes as formed of wire and having a frictional spring mounted between the chutes to retard the downward movement of the packages to the mechanical transposer means for dispensing the packages to their respective inclined trackways;

FIG. 12 is an enlarged partial sectional view taken in the area 12 of FIG. 10, illustrating the dispensing of the packages from the chutes to the inclined trackways;

FIG. 13 is a perspective view taken on line 13—13 of FIG. 12, illustrating the angular shaped transposer means and actuating spring assembly at the lower ends of the chutes;

FIG. 14 is a view similar to FIG. 12 illustrating another modified form of chutes and mechanical transposer means for dispensing the packages to the inclined trackways; and FIG. 15 is a partial sectional view taken substantially on line 15—15 of FIG. 14.

Figure 2:
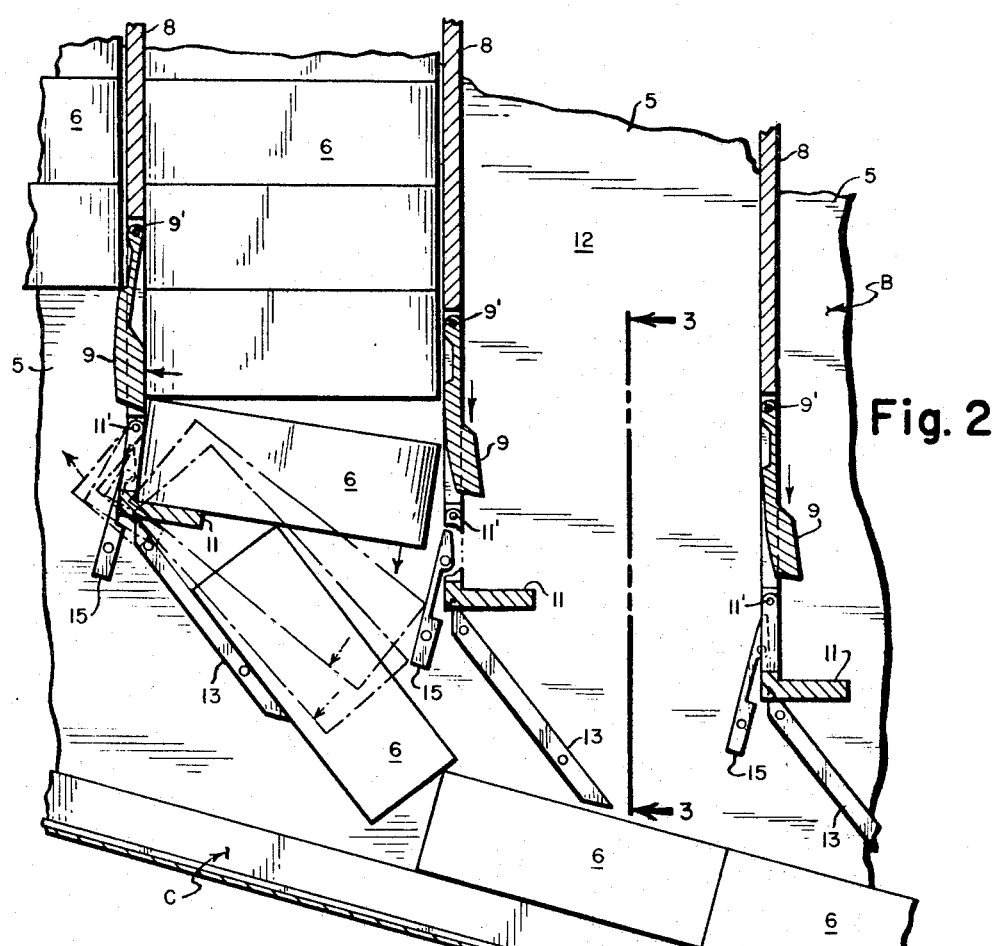
FIG. 2 is an enlarged partial sectional view taken in the area 2 of FIG. 1, illustrating the dispensing of packages progressively from the several chutes.

Referring more specifically to the drawings and particularly to the form of the invention shown in FIG. 1, a main cabinet A supports a series of vertical chutes 5 and, in this form of the invention, being 5 in number. The chutes 5 are open at their upper ends and also open at their lower ends. Underlying each of the chutes, is a single forwardly extending and downwardly inclined trackway C.

The vertical chutes, through means to be presently described, conduct packages of the food product to the trackway C, where the packages of food product are stopped by a stop device G.

The packages of food products are loaded into the chutes 5 and slide downwardly to be stopped by an angular shaped transposer 11, to be more fully described. The chutes are divided by walls 8 and 12. The transposer is an L-shaped body that is hingedly supported upon a cross rod 11', passing through tongues formed upon the wall 8 and constituting hinge elements. The transposer 11 is biased to a stop position by torsion springs 10, anchored at one end in the wall 8 and connected to the vertical wall of the transposer 11.

The holding lever 9 is hingedly supported in an opening of the wall 8 and the vertical wall of the transposer is cut away to form a clearance for the lever 9. The lever 9 constitutes a holding means for packages of chute products within the chute and the hinge for the lever 9 is indicated at 9', in FIGS. 2 and 3. Fixed to each of the partition walls 12, is an angular guide rail 13, upon which the packages 6 are dumped to subsequently fall into the trackway C. A stop rail 15 also functions to guide the package 6 in a manner illustrated in FIG. 2. As the package is released from the transposer, it falls downwardly to the rail 13 and then, when a package is removed by the purchaser at the discharge end of the trackway C, the several packages presently on the trackway will slide downwardly and permit the next package contacting the rails 13 to abut the upper corner of a next adjacent package disposed within the trackway.

The packages slidable upon the trackway C will be stopped by a stop G, having a vertical flange 51 that is pivotally connected to a lower plate 50 and biased by springs 52 so that, as the package 6 is manually lifted from the stop G, the plate 50 moves upwardly to dispose a flange in alignment with the next adjacent package 6, to prevent their sliding movement toward the flange 51 and, after the package 6 has been removed from the stop G, the stop and the plate 50 are then moved downwardly by the spring 52, permitting the next adjacent package to slide to the release position shown in FIG. 7.

Inwardly of the stop G, there is provided a housing F of channel form having side flanges 30 notched at 37 fitted into the trackway C. The housing F carries a counter 38 and also a pricing roller 34. The pricing roller 34 is carried by a shaft 36 removably seated in the notches 77 whereby the pricing roller may be placed by another roller having different numerals thereon or removed for changing the existing numerals thereon. The pricing roller is rotated by friction rollers 35 that are contacted by the packages 6 as they ride thereover and an inking device 31 has a wick 32 that continuously inks the pricing figure numerals as the pricing roller 34 is rotated to stamp the price figure upon each of the packages. The counter 38 is actuated by each package as it rides over the friction roller 39 to maintain a constant inventory of the articles dispensed in the trackways.

Cabinet A is pivotally connected to a shaft 18 having fitment into diagonal notches 18' cut into the sidewalls of the trackway C and the trackway C is in two sections, held together by a bracket 17 so that the cabinet A may be swung downwardly to the dotted line position of FIG. 1 whereby to expose the open upper ends of the chutes 5 for loading purposes. The cabinet is limited in its downward movement by a cable as shown in FIG. 1.

With respect to the modified form of the invention shown in FIGS. 10 to 15, the structure is basically the same as the structure recited with respect to cabinet A. The modified form of cabinet H, as illustrated in FIG. 10, has a series or bank of chutes 60 open at their tops and each provided at the bottom with an angular shaped transposer 70. In this form of the invention, the chutes dump or guide the food packages 62 or other articles into individual corresponding inclined trackways 63. The cabinet H is pivotally supported as indicated at 74 upon the rear wall of a base cabinet 59 so that the cabinet H may be tilted forwardly and downwardly to expose the open upper ends of the chutes for loading. Fixed to the roller side of a lowermost trackway 63, is a bracket 78, to which is fixed a cable 76 that overrides a pulley 77. A winding drum 75 connected to the cable 76 is employed to return the cabinet and the trackways to an upper active position and the lowermost trackway 63 engages a key actuated latch 80.

The trackways 63 at their forward discharge ends are provided with stops 63' and the trackways adjacent their discharge ends may be provided with a housing F containing a counter mechanism and a pricing roller, similar to that illustrated in FIG. 9 and employed in the first form of the invention. Stops G, such as illustrated in FIG. 8, may be employed, if desired.

As illustrated in FIG. 11, U-shaped springs 61 are supported upon cross bars 61' and the springs 61 are in spaced relation with respect to each of the chutes 60 and constitute retarding means for the sliding movement of the packages 62, so that the entire weight of the column of packages will be evenly distributed throughout each of the chutes. The structure of cabinet H may be of relatively hard wire, as shown particularly in FIG. 11. FIGS. 12 and 13 also illustrate the structure as formed of wire.

FIG. 13 further illustrates a modified form of transposer 70, having a torsion spring 71. In FIG. 13, the transposer is supported upon a cross wire 72, forming a part of the chute and, as the packages slide downwardly in the chutes 60, they rest upon the chute portion of the transposer and, as the bottom package 62 enters the trackway, the next adjacent package will fall downwardly to the transposer 70 to rest upon the upper rear end of said bottom package and the packages on the trackway 66 move downwardly to engage the trackway 63, the entire group of packages sliding downwardly to engage the stops. The ribs 70' shown at the angle portion of transposer 70 in FIG. 13 are for the purpose of frictionally holding the rear end of the package when it is in engagement with the transposer.

In FIGS. 14 and 15, the entire apparatus is formed of a wire frame J forming the chutes 90, having the friction springs 91 for retarding the packages 92 and also forming the inclined trackways 93. A shaft 103 extends across the machine and carries arms 102 that are pivotally supported upon the shaft 103 whereby another modified form of transposer 101 is centrally disposed with respect to each chute. Split washers 104 are fixed upon the shaft 103 properly to fix the transposer centrally of the chute.

Figure 3:
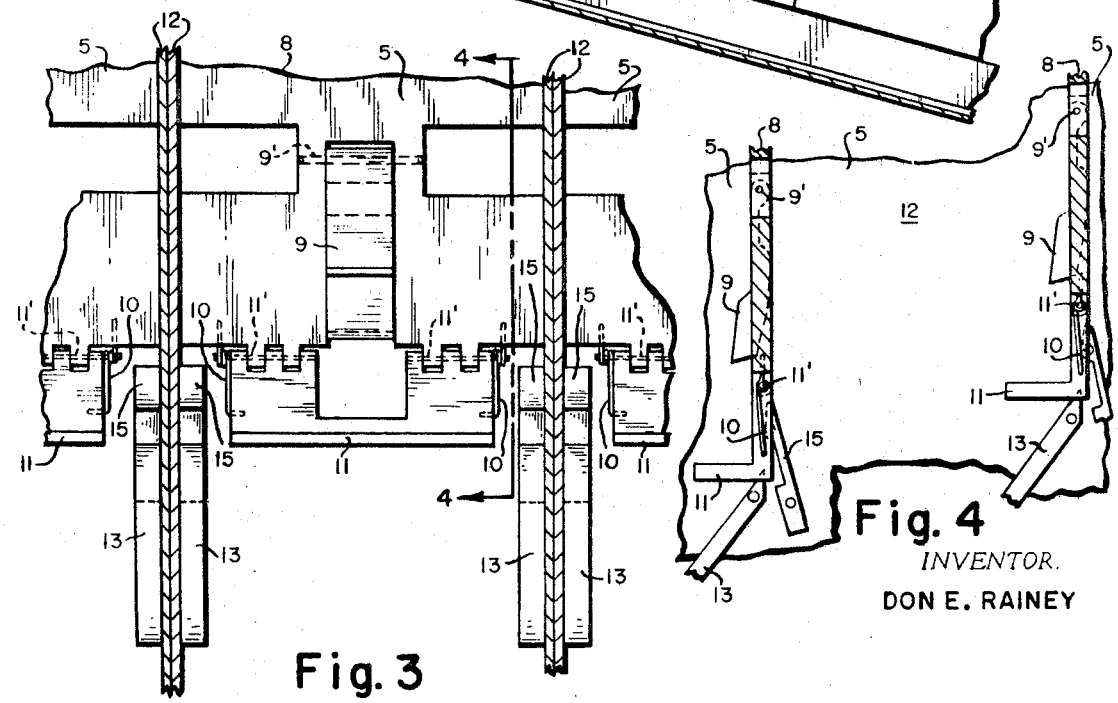
FIG. 3 is a partial sectional view taken on line 3—3 of FIG. 2 illustrating the mechanical transposer means for dispensing the packages from the several chutes to the trackway.
Figure 4:
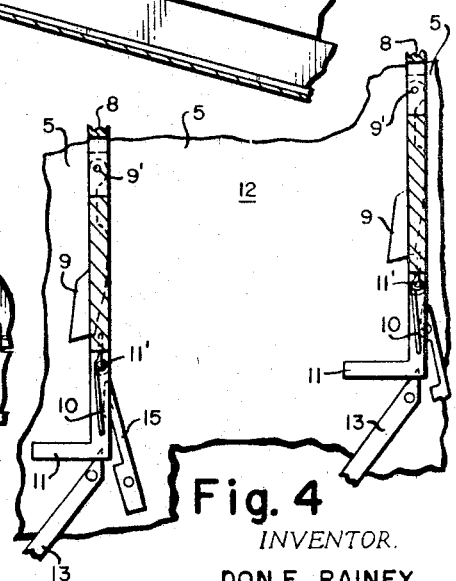
FIG. 4 is a partial transverse section taken on line 4—4 of FIG. 3 illustrating the mechanical transposer means for dispensing the packages.
Figure 5:
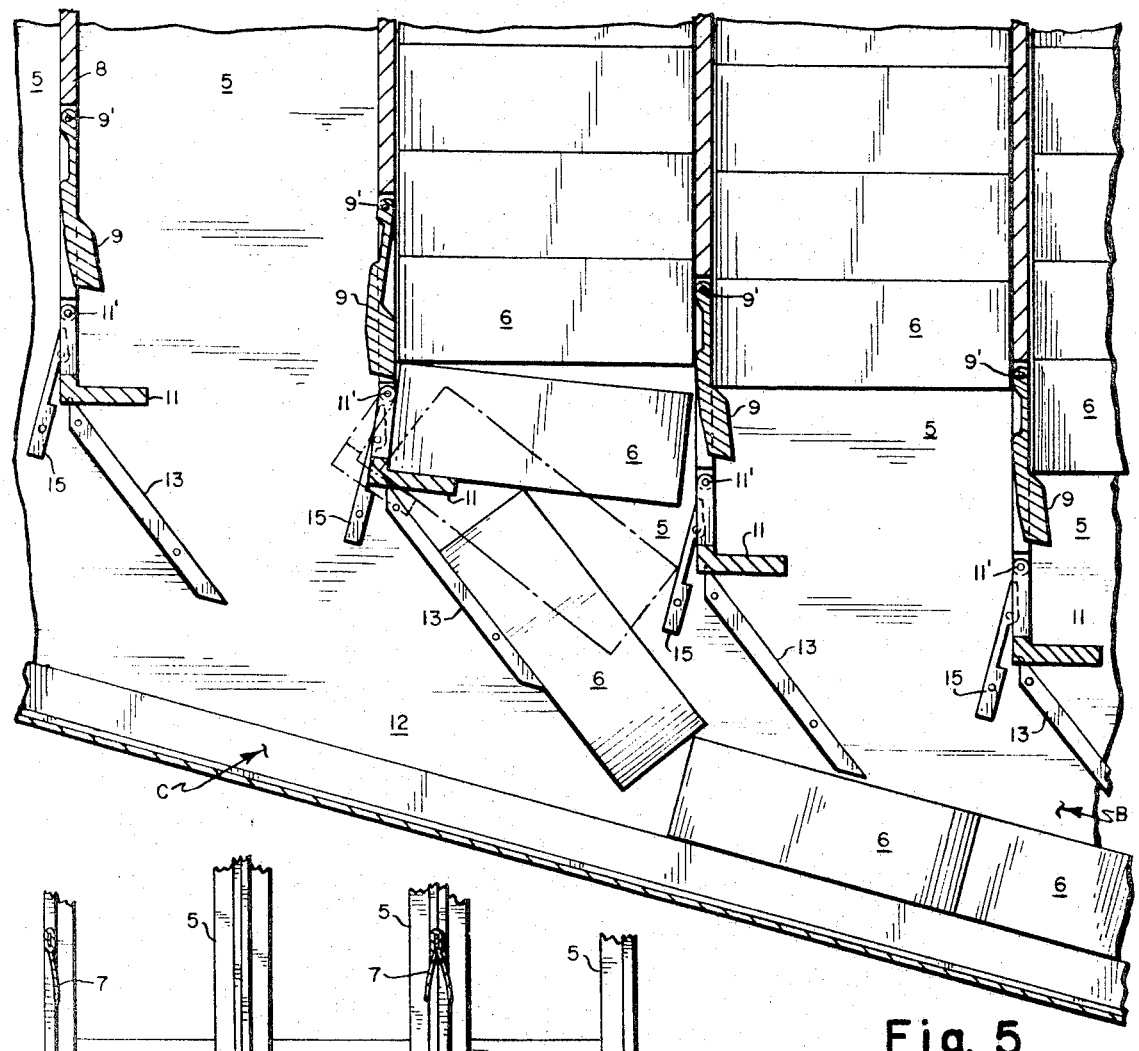
FIG. 5 is a view similar to FIG. 2 showing the dispensing of the packages progressively from the several chutes.
Figure 6:
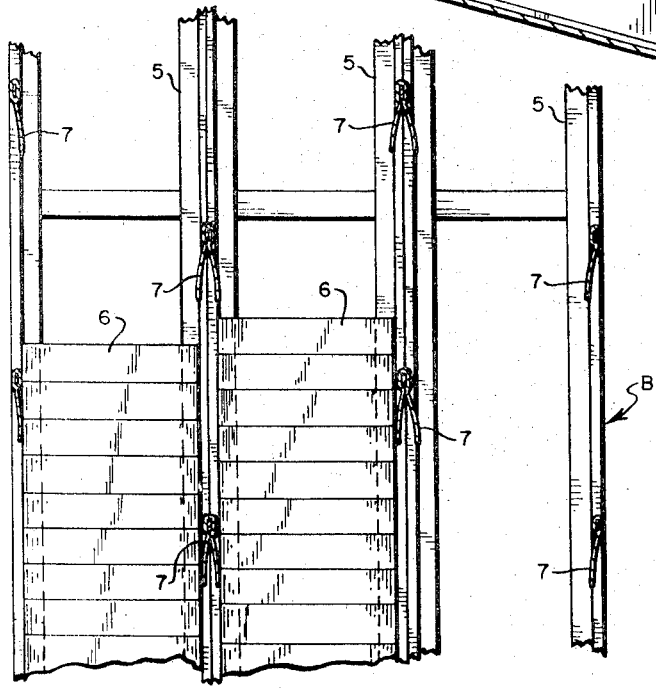
FIG. 6 is a partial transverse section taken on line 6—6 of FIG. 1 illustrating the chute formed by structural shapes and having frictional springs mounted between the chutes to retard the downward movement of the packages to the mechanical means.

The rearwardly extending elements shown at 67 in FIGS. 10, 12 and 13 and at 98 in FIGS. 14 and 15 are opposed to the transposer 70 and 101 respectively, and serve as abutments or guides for the packages as they are gravitated from horizontal position to inclined position on the trackways in a manner similar to the transposers 11 and guides 15 illustrated in FIGS. 1 and 2.

The devices of this invention relate to a system of vertical chutes in multiple depth and to revolutionizing mechanically controlled dispensing features attached to the bottom section of each chute that converts the angle of the package to flow out into a downwardly inclined dispensing trackway. The filling of the chutes from the top and the dispensing from the bottom causes automatic rotation of the product and the forward motion of the packages in the trackways activates a stamping roller and counter device. Therefore, when the packages are removed from the machine, they are already automatically priced and inventoried. The devices can be used for either refrigerated or non-refrigerated food products, packages or other items and can be utilized, for instance, in grocery stores or drug stores to replace shelving, inventorying, pricing, rotation of stock and refrigeration where needed.

It is to be undestood that the present invention is not confined to the precise construction and arrangement of parts as herein illustrated and described but embraces all such modifications thereof as may come within the scope of the invention.

I claim:

1. Display and vending apparatus for storing and dispensing articles which comprises,
    a cabinet having a multiplicity of vertically arranged chutes for receiving the articles in stacked horizontal position;
    a downwardly inclined dispensing trackway communicating with each of said chutes for sliding dispensing movement of said articles;
    a stop device at the outer end of said trackway to limit the sliding movement of said articles;
    transposer means pivotally supported at the lower ends of each chute for engaging an edge portion of the articles to shift the lowermost articles in the chutes from horizontal position to downwardly inclined position in the trackway and then to return to article engaging position; and
    means for holding articles within the other chutes while articles are released from a selected chute whereby to release articles progressively from each of said chutes onto said trackway.

2. The apparatus of claim 1 wherein the transposer means functions in cooperation with the articles in the downwardly inclined trackway to provide a support for the lowermost articles in the chutes whereby the dispensing of an article activates the transposer means resulting in the shifting of the lowermost article from horizontal position in a chute to downwardly inclined position in the trackway.

3. The apparatus of claim 1 wherein said stop device comprises,
    an upwardly directed flange pivotally connected to a lower plate whereby an article may be removed from the outer end of the trackway and cause the plate to move into the path of movement of the next article;
    spring means to bias the stop device and its flange into a position to receive the next adjacent article in the trackway; and
    a flange at the inner end of said plate that is shifted into the path of movement of the articles and then shifted downwardly after a first article has been removed from behind the flange to permit the movement downwardly in the trackways.

4. The apparatus of claim 1 wherein the transposer means comprises an L-shaped angular element.

5. The apparatus of claim 1 additionally including spring means biasing the transposer means into position for receiving the next adjacent article in the chutes.

6. The apparatus of claim 4 additionally including spring means biasing the transposer means into position for receiving the next adjacent article in the chutes.

7. The apparatus of claim 1 additionally including article guide means opposed to said transposer means.

8. The apparatus of claim 7 wherein the article guide means also extends in the direction of said transposer means.

9. The apparatus of claim 1 additionally including friction spring means within the chutes to retard movement of articles downwardly of the chutes toward the transposer means.

10. The apparatus of claim 1 wherein the upper cabinet and the trackways are disposed upon a lower cabinet and the upper cabinet is pivotally supported at its lower rearward end portion to be rotated downwardly to dispose the open upper ends of the chutes in a position for loading.

11. The apparatus of claim 1 wherein the trackway is provided with counter means for the dispensed articles.

12. The apparatus of claim 1 wherein the trackway is provided with rollers over which the articles pass for printing indicia such as sales price upon the article.

13. The apparatus of claim 1 wherein a space is provided between adjacent chutes and the holding means is pivoted to swing outwardly of the path of articles in one chute through said space into the path of articles in the adjacent chute.

14. The apparatus of claim 1 additionally including a downwardly inclined angular rail for receiving articles from the transposer means and guiding the articles into the trackway.

References Cited

UNITED STATES PATENTS

| | | | |
|---|---|---|---|
| 2,733,833 | 2/1956 | Skillman | 221—7 |
| 3,010,556 | 11/1961 | Wawrzonek et al. | 221—125 X |
| 3,043,474 | 7/1962 | Mullin | 221—295 X |
| 3,056,132 | 9/1962 | Simjian | 194—4 |
| 3,108,713 | 10/1963 | Fazekas | 221—201 X |
| 3,110,417 | 11/1963 | Wingate et al. | 221—295 X |

STANLEY H. TOLLBERG, Primary Examiner

U.S. Cl. X.R.

221—111